United States Patent
Morton et al.

(10) Patent No.: US 12,497,905 B1
(45) Date of Patent: Dec. 16, 2025

(54) NON-UNIFORM AND BI-TRI STATOR SPACING FOR SWIRL RECOVERY VANE (SRV) OPEN ROTOR ENGINES

(71) Applicant: RTX Corporation, Farmington, CT (US)

(72) Inventors: Jeffrey T. Morton, Machester, CT (US); Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/741,627

(22) Filed: Jun. 12, 2024

(51) Int. Cl.
*F01D 9/04* (2006.01)
*F01D 5/16* (2006.01)

(52) U.S. Cl.
CPC ............ *F01D 9/041* (2013.01); *F01D 5/16* (2013.01); *F05D 2260/961* (2013.01)

(58) Field of Classification Search
CPC ..... F01D 9/00; F01D 9/02; F01D 9/04; F01D 9/041; F01D 9/042; F01D 5/16; F01D 25/04; F01D 25/06; F05D 2260/961
See application file for complete search history.

(56) References Cited

U.S. PATENT DOCUMENTS

| | | | |
|---|---|---|---|
| 9,242,721 B2 | 1/2016 | Neuteboom | |
| 10,669,881 B2 | 6/2020 | Breeze-Stringfellow et al. | |
| 12,018,592 B1* | 6/2024 | Ramakrishnan | F01D 9/041 |
| 2012/0099961 A1* | 4/2012 | Delvaux | F04D 29/666 |
| | | | 415/220 |
| 2012/0099995 A1 | 4/2012 | Delvaux et al. | |
| 2013/0149135 A1* | 6/2013 | Hield | F04D 29/544 |
| | | | 415/208.2 |
| 2016/0097281 A1 | 4/2016 | Hanrahan | |
| 2017/0268537 A1* | 9/2017 | Mielke | F04D 29/666 |
| 2025/0075634 A1* | 3/2025 | Capps | F04D 29/542 |

FOREIGN PATENT DOCUMENTS

| | | |
|---|---|---|
| CN | 111042873 A | 4/2020 |
| FR | 3125091 A1 | 1/2023 |
| FR | 3141444 A1 | 5/2024 |
| FR | 3141445 A1 | 5/2024 |

OTHER PUBLICATIONS

European Search Report dated Sep. 24, 2025, in connection with European Application No. 25182480.1, 13 pages.

* cited by examiner

Primary Examiner — Elton K Wong (57) ABSTRACT

A swirl recovery vane (SRV) open rotor engine include an engine core, a rotor having a plurality of rotor blades mounted to an end of the engine core and a plurality of stators mounted adjacent to the rotor. The stators are spaced in a non-uniform spacing to reduce a forcing function created by movement of the rotor blades past the stators.

18 Claims, 7 Drawing Sheets

NON-UNIFORM AND BI-TRI STATOR SPACING FOR SWIRL RECOVERY VANE (SRV) OPEN ROTOR ENGINES

TECHNICAL FIELD

This disclosure relates generally to swirl recovery vane (SRV) open rotor engines. More specifically, this disclosure relates to non-uniform and bi-tri stator spacing for SRV open rotor engines.

BACKGROUND

An aircraft propulsion system may include a guide vane structure arranged downstream of a propulsor rotor to condition air propelled by the propulsor rotor. Ducted fans include static fan exit guide vanes (FEGVs) downstream of the rotating fan to remove swirl and straighten the flow in the bypass duct before it reaches the upper and lower bifurcations. Open rotors, also called un-ducted fans, are alternatives to ducted fans. Three main types of open rotor architectures are currently available, including single rotor (SR), single rotor with swirl recovery vane (SRV), and counter-rotating open rotor (CROR). Acoustic response or noise is a challenge for open rotor propulsion systems as the acoustic treatment typically included in the bypass duct of a ducted fan is not present. Differing airfoil stage counts between the rotor and stator of an SRV open rotor can be used to reduce noise levels, but this does not reduce modal forcing on a rotor caused by a downstream stator count. Modal forcing on a rotor from a downstream stator is a challenge for open rotors.

SUMMARY

This disclosure relates to non-uniform and bi-tri stator spacing for swirl recovery vane (SRV) open rotor engines.

In a first embodiment, a swirl recovery vane (SRV) open rotor engine include an engine core, a rotor having a plurality of rotor blades mounted to an end of the engine core and a plurality of stators mounted adjacent to the rotor. The stators are spaced in a non-uniform spacing to reduce a forcing function created by movement of the rotor blades past the stators.

Any single one or any combination of the following features may be used with the first embodiment. The SRV open rotor engine where the stators are spaced to reduce an acoustic signature of the engine. The stators are spaced in a bi-tri spacing configuration may include a first group of three groups of stators in a first spacing and a second group of three groups of stators in a second spacing. The non-uniform spacing prevents interference with connection of the engine to an engine pylon for connecting the engine to a wing. The non-uniform spacing may include a first group of three groups of stators in a first spacing and a second group of three groups of stators in a second spacing, and a local spacing adjustment to prevent interference. The non-uniform spacing enables air to flow between at least a portion of the stators and past an engine pylon connecting the engine to a wing. The non-uniform spacing provides a positive resonance with respect to a first portion of the stators and a negative resonance with respect to a second portion of the stators. The stators may include a predetermined number of stators to reduce the forcing function for a given number of rotor blades.

In a second embodiment, a swirl recovery vane (SRV) open rotor engine. The swirl recovery vane also includes an engine core. The vane also includes a rotor having a plurality of rotor blades mounted to a front end of the engine core. The vane also includes a plurality of stators mounted aft of the rotor. The vane also includes where the stators are spaced in a bi-tri spacing configuration to reduce a forcing function created by movement of the rotor blades past the stators. The vane also includes where the bi-tri spacing of the stators provides a positive resonance with respect to a first portion of the stators and a negative resonance with respect to a second portion of the stators.

Any single one or any combination of the following features may be used with the second embodiment. The SRV open rotor engine where the stators are further spaced to reduce an acoustic signature of the engine. The bi-tri spacing configuration may include a first group of three groups of stators in a first spacing and a second group of the three groups of stators in a second spacing. The bi-tri spacing prevents interference with connection of the engine to an engine pylon for connecting the engine to a wing. The bi-tri spacing enables air to flow between at least a portion of the plurality of stators and past an engine pylon connecting the engine to a wing. A number of the stators are selected to reduce the forcing function for a given number of rotor blades.

In a third embodiment, a propulsion system also includes an engine core. The system also includes a rotor having a plurality of rotor blades mounted to a front end of the engine core. The system also includes a plurality of stators mounted aft of the rotor. The system also includes where the stators are spaced in a non-uniform spacing about the engine core.

Any single one or any combination of the following features may be used with the third embodiment. The propulsion system where the non-uniform spacing reduces an acoustic signature of the propulsion system. The stators are spaced in a bi-tri spacing configuration. The non-uniform spacing prevents interference with connection of the propulsion system to an engine pylon for connecting the propulsion system to a wing. The non-uniform spacing enables air to flow between at least a portion of the stators and past an engine pylon connecting the propulsion system to a wing. The non-uniform spacing provides a positive resonance with respect to a first portion of the stators and a negative resonance with respect to a second portion of the stators.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
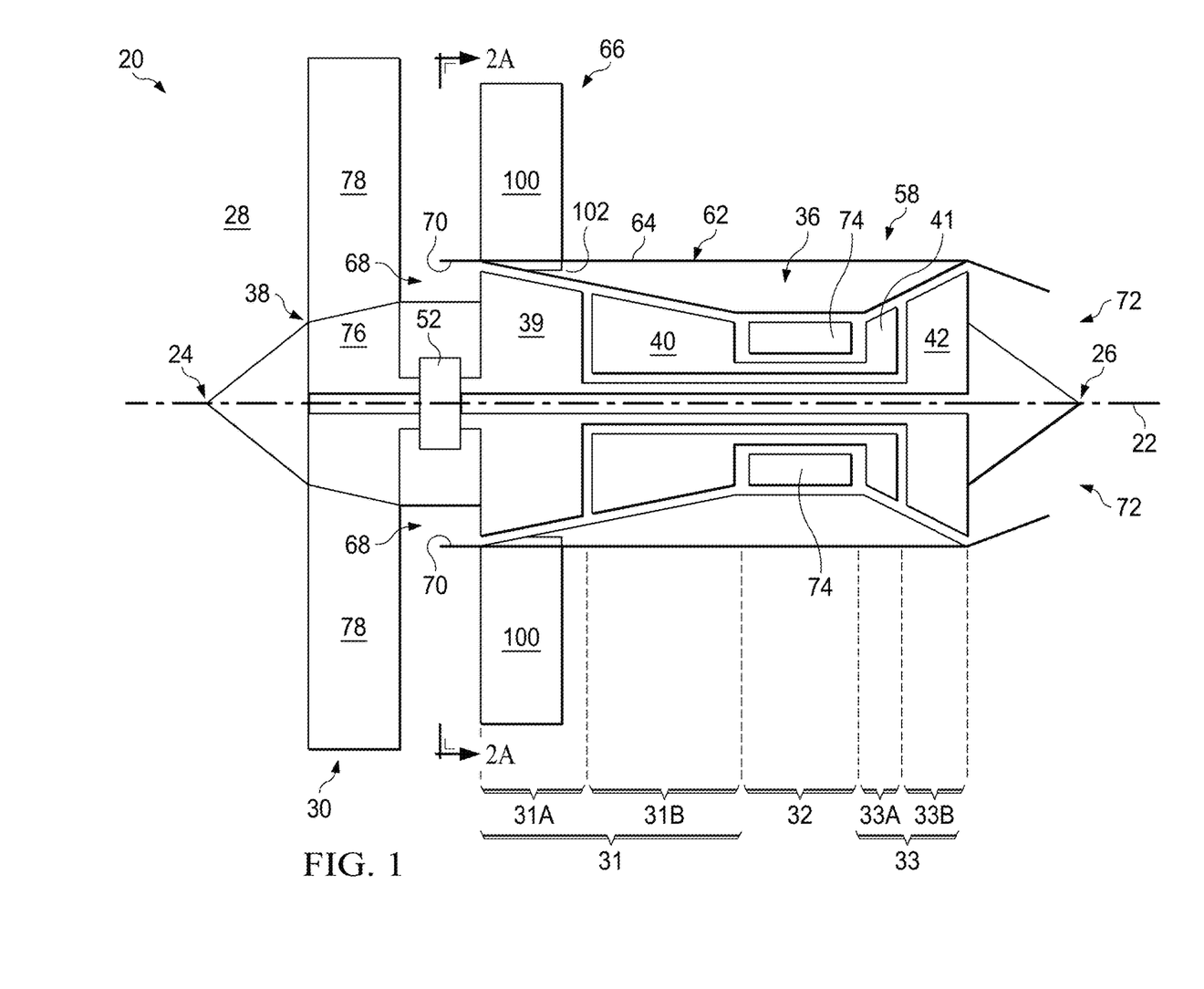
FIG. 1 illustrates a side schematic of a swirl recovery vane (SRV) open rotor propulsion system.

FIG. 1 illustrates a propulsion system 20 for an aircraft. The aircraft may be an airplane, a drone (such as an unmanned aerial vehicle (UAV)), or any other manned or unmanned aerial vehicle or system. The aircraft propulsion system 20 extends axially along an axis 22 between a forward upstream end 24 of the aircraft propulsion system 20 and an aft downstream end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20.

The aircraft propulsion system 20 of FIG. 1 is configured as an open rotor propulsion system, such as a swirl recovery vane (SRV) open rotor propulsion system. Here, the term "open" may describe a propulsion system section and/or a propulsion system component that is open to an external environment 28 (such as an ambient environment) external to the aircraft propulsion system 20 and more generally the aircraft. The aircraft propulsion system 20 of FIG. 1, for example, includes an open propulsor section 30, a compressor section 31, a combustor section 32, and a turbine section 33. The compressor section 31 of FIG. 1 includes a low-pressure compressor (LPC) section 31A and a high-pressure compressor (HPC) section 31B. The turbine section 33 of FIG. 1 includes a high-pressure turbine (HPT) section 33A and a low-pressure turbine (LPT) section 33B. At least (or only) the LPC section 31A, the HPC section 31B, the combustor section 32, the HPT section 33A, and the LPT section 33B collectively form a gas generator 36, such as a turbine engine core. The gas generator 36 of FIG. 1 is depicted as an inline forward flowing two spool gas generator however other gas generator architectures including reverse flow, three spool (such as with a dedicated power turbine to mechanically power the propulsor section independent of the remainder of the gas generator) and offset cores are all considered within the scope of this disclosure.

The propulsor section 30 includes a bladed propulsor rotor 38. The propulsor rotor 38 of FIG. 1 is configured as an open rotor (such as an un-ducted rotor) that projects radially into and is exposed to the external environment 28. The LPC section 31A includes an LPC rotor 39, and the HPC section 31B includes an HPC rotor 40. The HPT section 33A includes an HPT rotor 41, and the LPT section 33B includes an LPT rotor 42. Each of the bladed rotors 39-42 of FIG. 1 is configured as a ducted rotor internal within the aircraft propulsion system 20 and outside of the external environment 28. Though not illustrated, it is understood that each of the LPC section 31A, the HPC section 31B, the HPT section 33A and the LPT section 33B may include one or more bladed rotors 39-42.

During operation of the aircraft propulsion system 20, ambient air within the external environment 28 is propelled by the propulsor rotor 38 in an aft downstream direction towards the propulsion system downstream end 26. A major portion (such as more than 50%) of this air bypasses the gas generator 36 to provide forward thrust while a minor portion (such as less than 50%) of the air flows into the gas generator 36. An outer stream of the air propelled by the propulsor rotor 38, for example, flows axially across a guide vane structure 66 of the propulsor section 30 and outside of the propulsion system housing 58 (along the nacelle wall 64 of the nacelle 62). The guide vane structure 66 is configured to condition (such as straighten out) the air propelled by the propulsor rotor 38, for example, to remove or reduce circumferential swirl and thereby enhance the forward thrust. An inner stream of the air propelled by the propulsor rotor 38 flows through an airflow core inlet 68 of a core flow path 70 into the aircraft propulsion system 20 and its gas generator 36. The core flow path 70 extends sequentially through the LPC section 31A, the HPC section 31B, the combustor section 32, the HPT section 33A, and the LPT section 33B from the core inlet 68 to a combustion products exhaust 72 from the core flow path 70 into the external environment 28. The air entering the core flow path 70 may be referred to as "core air."

The core air is compressed by the LPC rotor 39 and the HPC rotor 40 and directed into a combustion chamber 74 (such as an annular combustion chamber) of a combustor (such as an annular combustor) in the combustor section 32. Fuel is injected into the combustion chamber 74 and mixed with the compressed core air to provide a fuel-air mixture. This fuel-air mixture is ignited, and combustion products thereof flow through and sequentially drive rotation of the HPT rotor 41 and the LPT rotor 42. The rotation of the HPT rotor 41 and the LPT rotor 42 respectively drive rotation of the HPC rotor 40 and the LPC rotor 39 and thus compression of the air received from the core inlet 68. The rotation of the LPT rotor 42 also drives rotation of the propulsor rotor 38 through the geartrain 52. The rotation of the propulsor rotor 38 in turn propels the ambient air within the external environment 28 in the aft downstream direction. With this arrangement, the gas generator 36 powers operation of (such as drives rotation of) the propulsor rotor 38 during aircraft propulsion system operation.

The propulsor rotor 38 of FIG. 1 includes a propulsor rotor base 76 (such as a disk or a hub) and a plurality of open propulsor blades 78 (such as airfoils). The propulsor blades 78 are arranged circumferentially about the rotor base 76 and the axis 22 in an array, such as a circular array. Each of the propulsor blades 78 is connected to (such as formed integral with or otherwise attached to) the rotor base 76.

The guide vane structure 66 includes a plurality of stators 100 (such as airfoils or guide vanes) arranged circumferentially about the axis 22 in an array, such as a circular array. This guide vane structure 66 and its stators 100 are arranged axially next to (such as adjacent) the propulsor rotor 38 and its propulsor blades 78. The guide vane structure 66 and its stators 100, for example, are arranged downstream of the propulsor rotor 38 and its propulsor blades 78, without (such as any) other elements axially therebetween to obstruct, turn, and/or otherwise influence the air propelled by the propulsor rotor 38 to the guide vane structure 66 for example. Each of the stators 100 is coupled to a support structure 102 of the propulsion system housing 58. This support structure 102 may be a support frame, a case, or another fixed structure of the propulsion system housing 58.

Figure 2:
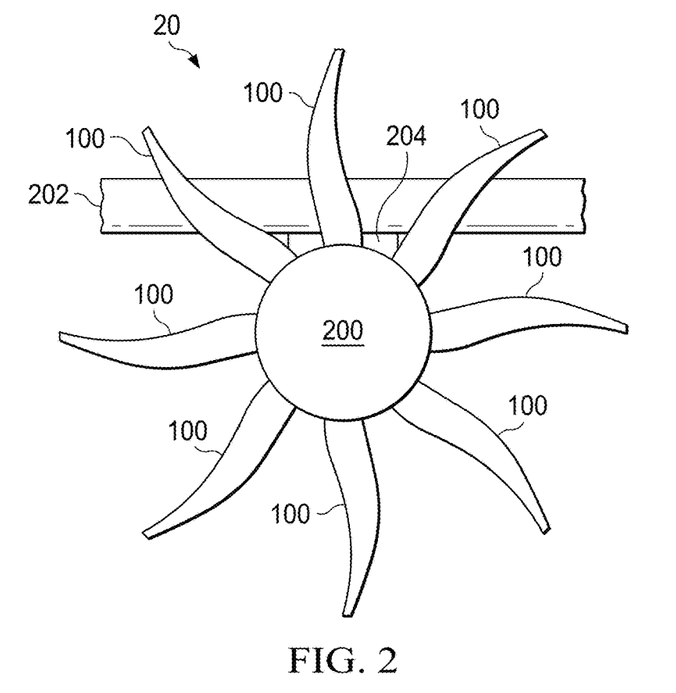
FIG. 2 illustrates a view of uniform stator spacing.

Referring now to FIG. 2, there is illustrated a uniform stator spacing for the stators 100 surrounding the engine core 200 including the gas generator 36 (FIG. 1). The propulsion system 20 (such as an SRV open rotor system) is connected to the wing 202 of an aircraft using an engine pylon 204. By spacing the stators 100 in a uniform fashion, the modal forcing of the propulsor blade 78 by the guide vane structure 66 is reinforced each time a propulsor blade 78 of the propulsor rotor 38 rotates past a stator 100. The uniform spacing of the stators 100 cause the modal forces to additively combine rather than cancel each other out, which can cause damage to both the stators 100 and the propulsor blades 78 of the propulsor rotor 38.

Figure 3:
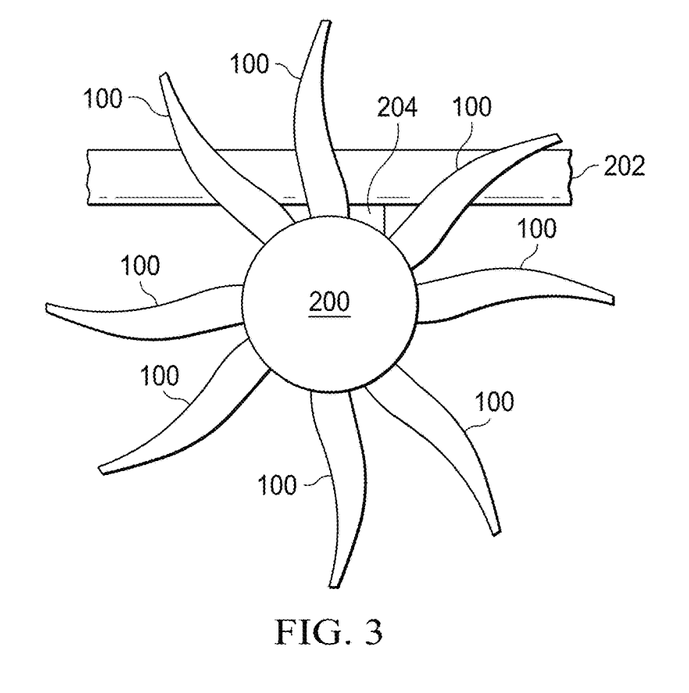
FIG. 3 illustrates a view of non-uniform stator spacing.

Referring now to FIG. 3, stators 100 are shown connected to the engine core 200 in a non-uniform stator spacing. Connection would be accomplished via the support structure 102 (not shown) discussed previously with respect to FIG. 1. As described with respect to FIG. 2, the engine is connected to a wing 202 of an aircraft via an engine pylon 204. The non-uniform stator spacing can reduce the forcing function applied on the propulsor rotor 38 due to the downstream stators 100, as well as reduce the acoustic signature of the propulsion system 20 with potential benefits of reducing both cabin and far-field noise. The illustration in FIG. 3 of a non-uniform stator spacing does not represent a particular spacing arrangement providing negative reinforcement of the forcing function. The example merely illustrates the non-uniform spacing of stators 100 about the engine core 200.

One manner for further limiting the effects of the forcing function upon the propulsor rotor 38 due to movement of the rotor propulsor blades 78 past stators 100 may be achieved by spacing the stators 100 in a fashion that creates negative reinforcement of the forcing function. As mentioned previously, uniform spacing of the stators 100 causes an additive effect to the forcing function that increases the modal forces caused by the rotation of the propulsor rotor 38 with respect to the stators 100. One manner for limiting the forcing function involves placing a portion of the stators 100 in an orientation that creates a negative reinforcement of the forcing function, limiting the overall forcing function where the negative elements of the forcing function offset the positive elements. One manner for doing this utilizes a bi-tri spacing of the stators 100 as more particularly illustrated in FIG. 4. The "bi-tri" terminology refers to the use of two stator spacings each arranged into three groups.

Figure 4:
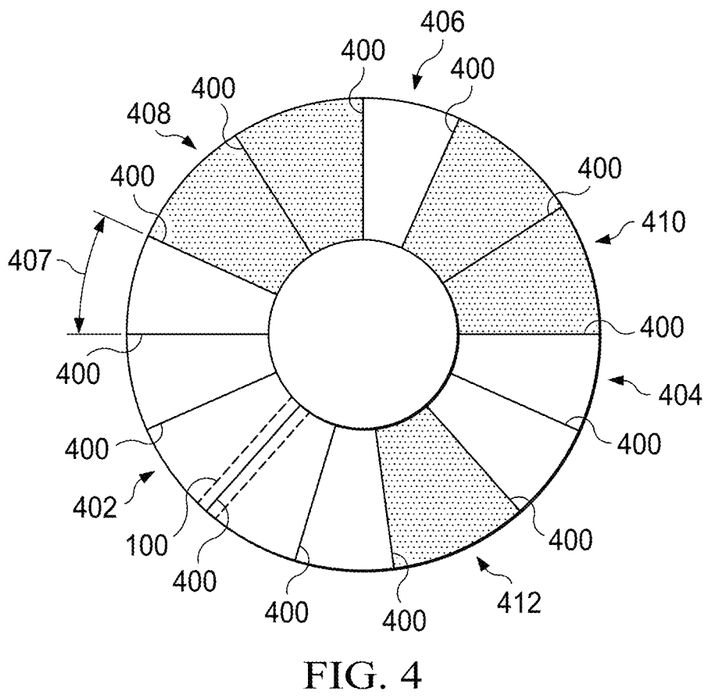
FIG. 4 illustrates stators having asymmetric spacing of vanes in a bi-tri stator spacing pattern.

FIG. 4 provides an illustration of the spacing of stators 100 on the propulsion system 20 (such as an SRV open rotor engine). Each of the lines 400 represents a stator pitch axis running through the central portion of the stator 100. A bi-tri spacing pattern of stators 100 involves having three ("tri") groups of stators having two ("bi") different spacings for a total of six groups or portions of stators. Each of the pie-shaped sections represents the angular spacing between adjacent stators 100. Thus, the first group of three groups of stators includes portion 402, portion 404, and portion 406. Portion 402 includes five stators, portion 404 includes two stators, and portion 406 includes one stator. This first group of three groups of stators has an exemplary first spacing (one of two) between stators 100 of 24.2 degrees +/−. The spacing of a given stator 100 can be defined as the angular spacing between that stator and the adjacent stator in a given direction (such as clockwise forward looking aft) with this direction utilized to define the spacing of all stators in a given set. The spacing is defined by the distance between the lines 400 as shown in FIG. 4 (indicated generally at 407). The second group of three groups of stators includes portion 408, portion 410, and portion 412. Portion 408 includes two stators, portion 410 includes two stators, and portion 412 includes a single stator. This second group of three groups of stators has the second exemplary spacing of the stators of 33.3 degrees +/−.

Figure 8:
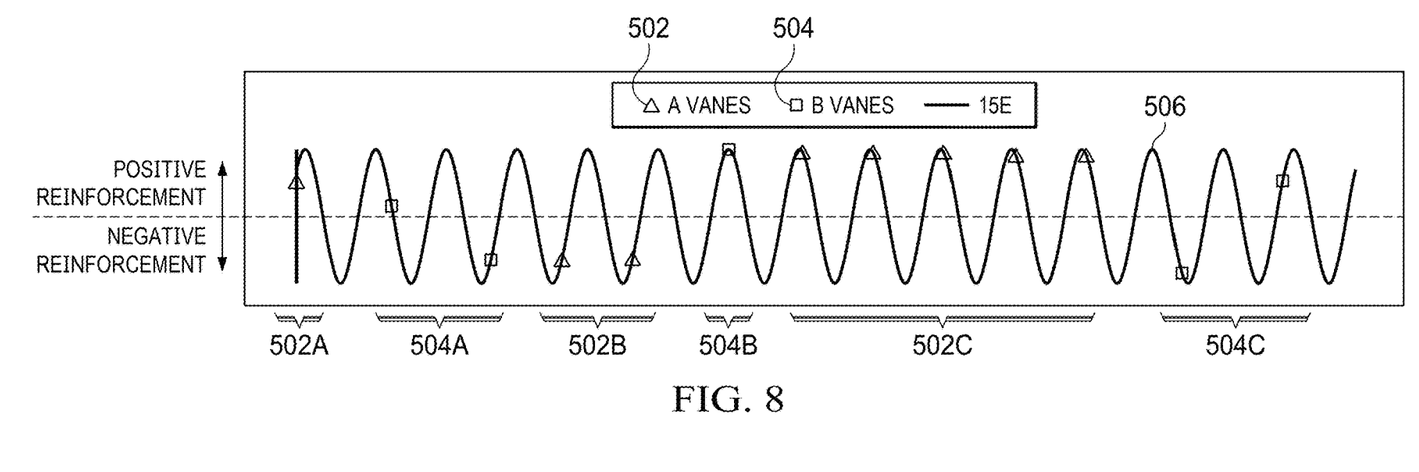
FIG. 8 illustrates the resonance forces applied by a stator responsive to passage of a rotor blade past the stator for a frequency of 15 times the engine rotor speed.

As mentioned previously, the bi-tri spacing of the stators 100 reduces the reinforcement of any given frequency by situating some vanes to provide negative reinforcement, as more particularly illustrated in FIG. 8. Periodic line 506 indicates a frequency of interest that is a whole number multiple of the propulsor rotor speed. In this case, periodic line 506 of FIG. 8 has a frequency of "15E" or 15 times the engine rotor speed, as it forms 15 consecutive sine waves from left to right, representing one revolution of the rotor. Thus, each sine wave is $1/15^{th}$ of a revolution, or 24 degrees, which is very close to the first spacing interval. A series of periodic lines could be plotted to evaluate all frequencies of interest. Indicators 502 and 504 indicate the reinforcement of this 15E frequency from stators 100 arranged in the manor shown in FIG. 4. Indicators 502 are from the first group of stators 100 including the portions 402, 404, and 406, represented respectively by indicators 502C, 502B, and 502A. Indicators 504 are from the second group of stators 100 including the portions 408, 410, and 412, represented respectively by indicators 504C, 504A, and 504B.

Figure 9:
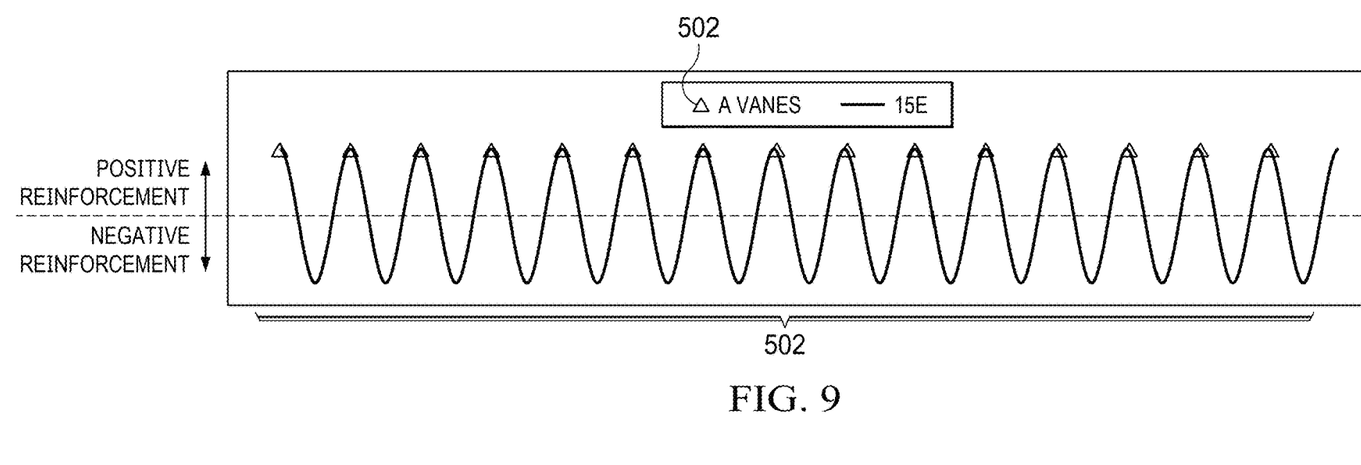
FIG. 9 illustrates the resonance forces applied by a stator responsive to passage of a rotor blade past the stator for a second configuration.

If all stators 100 were placed with a uniform spacing, the frequency that matched that spacing would occur at the peaks of the frequency function, thus causing an additive reinforcement of the modal forcing from the entire set of stators 100, as illustrated in FIG. 9. By spacing the stators 100 in a nonuniform fashion, the periodic line 506 crosses the stators at various parts of its sinusoidal cycle such that reinforcing forces are both positive and negative and substantially cancel each other out to minimize the overall net reinforcement. Since the repeating reflection from uniform spacing is known to acoustically produce a noise tone, reduced reinforcement will reduce the acoustic signature of the propulsor/stator interaction.

Figure 10:
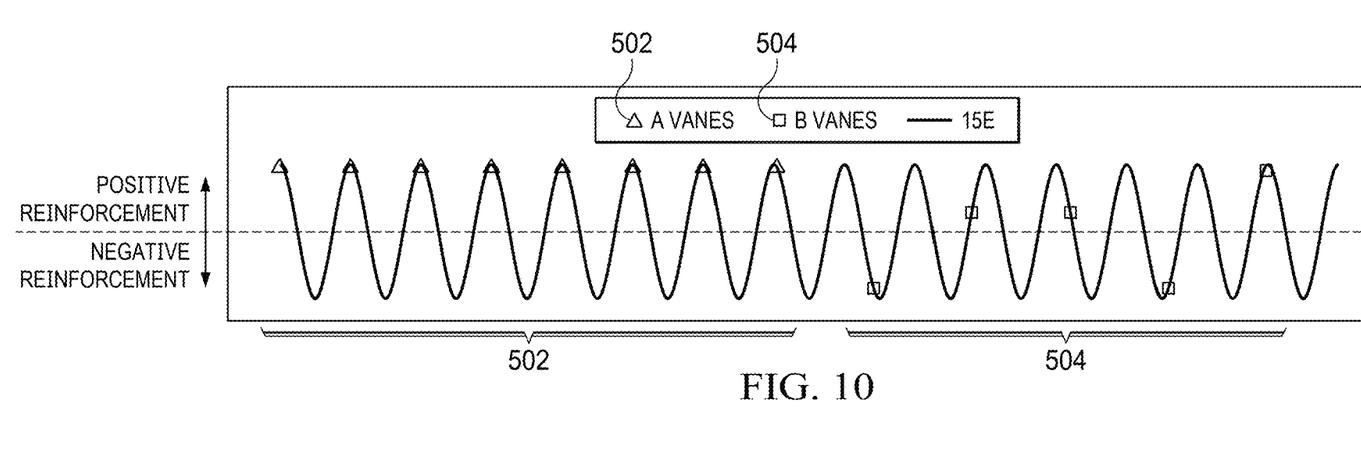
FIG. 10 illustrates the resonance forces applied by a stator responsive to passage of a rotor blade past the stator for a third configuration.

Prior asymmetric stator spacing considered two stator spacings each in a single cluster (i.e., half wheel asymmetry). FIG. 10 illustrates the lesser benefit of half wheel asymmetry as compared to bi-tri spacing. This configuration utilizes the same number of stators at the same spacings, except that all of stators 502 sit on the nearest (15E) frequency, while in FIG. 8, only one of the three groupings of stators 502 sit on that frequency. Thus, uniform spacing results in full reinforcement, half wheel asymmetry results in somewhat reduced reinforcement, and bi-tri asymmetry results in greatly reduced reinforcement.

Figure 5:
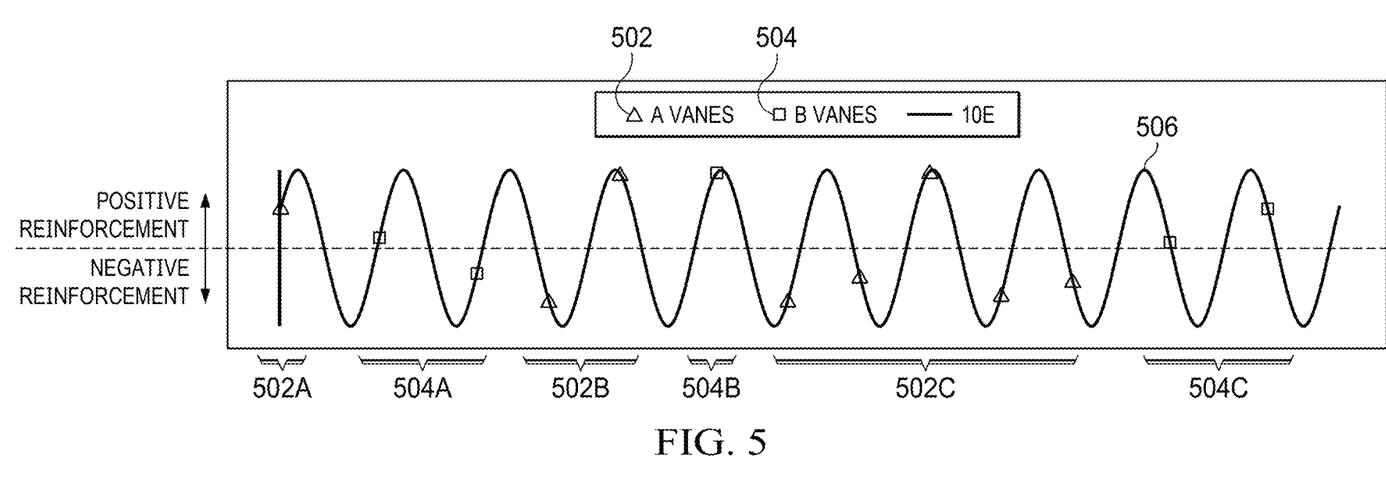
FIG. 5 illustrates the resonance forces applied by a stator responsive to passage of a rotor blade past the stator for a frequency of 10 times the engine rotor speed.

In this way, the bi-tri spacing of the stators 100 can provide a number of benefits to SRV open rotor engine operation. These include a reduction in the resonance reinforcement significantly for reduced high-cycle fatigue (HCF) stress, lower tone noise, and potentially lower total noise. The noise benefits may be realized in a reduction of far-field noise as well as in-cabin noise. The freedom to tailor angular spacing of groups and quantity of stators in each grouping enables reductions in resonant strength of important drivers such as rotor blade count. The bi-tri spacing can be tailored to adjust the number of stators in each of the six groups and the angular spacings of each of the two spacings such that the resonance response at the frequencies of interest are sufficiently reduced. Some frequencies may be prioritized more than others. The current example (FIG. 4) was designed for a propulsion rotor with 10 blades, so 10E was highly prioritized for reinforcement reduction. FIG. 5 shows the greatly reduced reinforcement at 10E with 6 of the 13 stators in negative reinforcement (i.e., in bottom half of sine wave). This demonstrates that bi-tri spacing can be used to prioritize reduction of specific frequencies while not creating a high response at other engine orders. Benefits of bi-tri spacing is not limited to these exemplary stator counts or engine order(s) of interest.

While the placement of the stators 100 in a bi-tri spacing configuration has been shown to reduce the resonances in the forcing function, placement of the stators may be provided in other configurations to improve other aspects of SRV open rotor engine functioning and operation. Spacing of the stators 100 in a nonuniform fashion, such as bi-tri spacing, can provide a number of benefits even if negative reinforcement of resonance is not achieved. These may include structural and/or acoustic benefits and the realization of packaging benefits such that stator mounting hardware and variable pitch actuation systems can be located around other engine hardware, mounts, and/or the pylon. Additionally variable pitch rotor blades may be used in the system.

Figure 6:
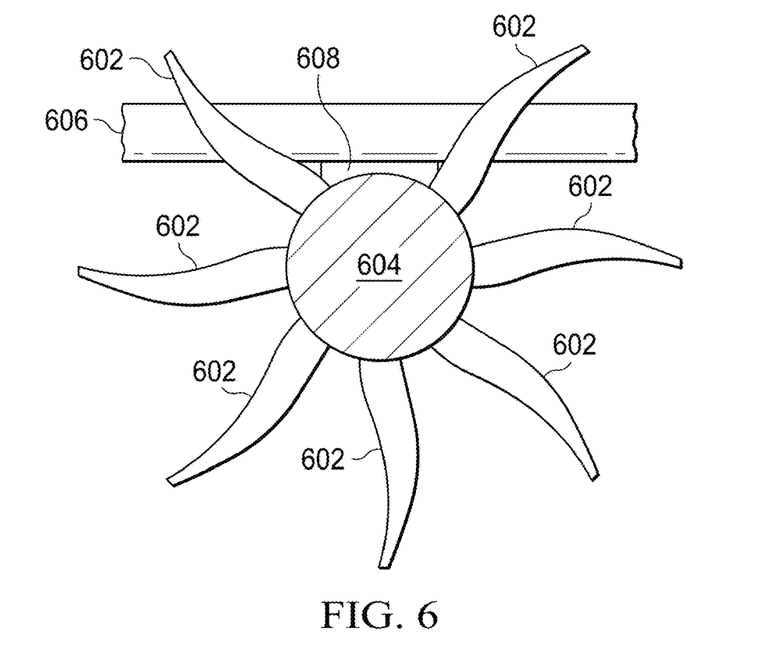
FIG. 6 illustrates an alternative embodiment of a non-uniform stator spacing.

FIG. 6 illustrates a configuration where a stator is omitted to alleviate packaging constraints. Stators 602 are spaced evenly about the engine core 604 with the exception of a location located at the top of the core 604. At this point, the core 604 is connected to the wing 606 via a pylon 608. In this case, an unequal spacing is only provided at the location at the top of the engine where in the stator 602 has been removed to enable connection via the engine pylon 608 without interfering with a stator. Additionally, the removal of a stator 602 from the pattern can be coupled with the bi-tri spacing pattern discussed earlier such that the negative reinforcement is achieved to provide a local spacing adjustment of the stators. The clocking of the bi-tri spacing may be selected such that the negative reinforcement at the engine order(s) of interest are further optimized. Additionally, this configuration would provide additional packaging space for pylon mounting or other purposes.

Figure 7:
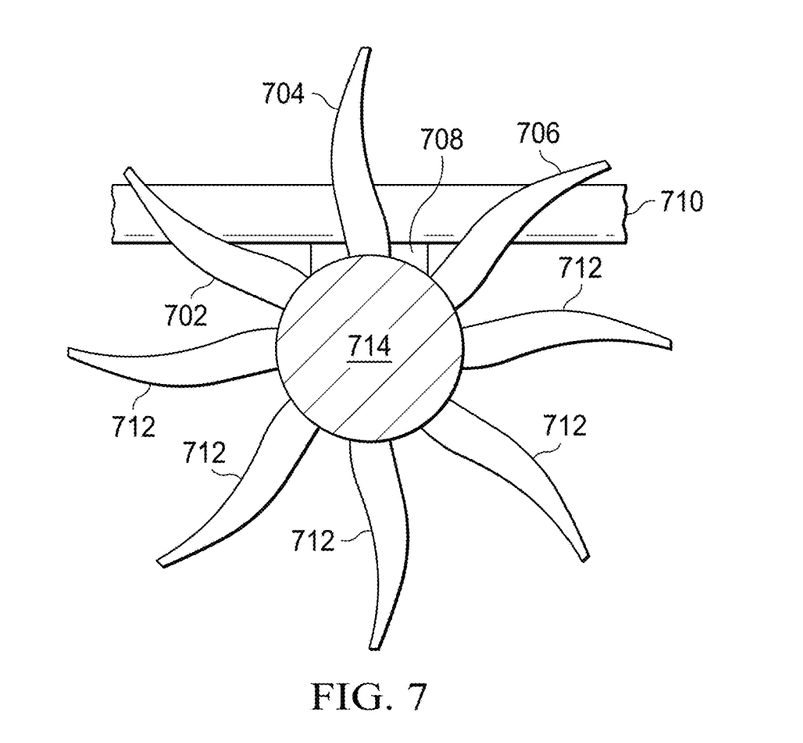
FIG. 7 illustrates another alternative embodiment of a non-uniform stator spacing.

FIG. 7 illustrates an alternative embodiment wherein a spacing between stators 702, 704 and 706 is made slightly larger providing a local spacing adjustment to accommodate airflow between the stators 702, 704 and 706 and the engine pylon 708. The larger space enables air to flow through the openings between the stators 702, 704 and 706 and then past the engine pylon 708 connecting to the wing 710 or otherwise direct the flow of air around the pylon in an optimal way. The spacing between the stators 702, 706 and the remaining stator 712 is equal. Each of the stators connects to the engine core 714. The location of the stators with the second, larger, spacing relative to the pylon or the quantity of stators with each spacing can be optimized given a desired stator count and pylon sizing.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A swirl recovery vane (SRV) open rotor engine comprising:
    an engine core;
    a rotor having a plurality of rotor blades mounted to an end of the engine core; and
    a plurality of stators mounted downstream of the rotor;
    wherein the stators are spaced in a non-uniform spacing to create a negative reinforcement of a forcing function created by movement of the rotor blades past the stators, and
    wherein the stators are spaced in a bi-tri spacing configuration comprising a first group of three groups of stators in a first spacing and a second group of three groups of stators in a second spacing different from the first spacing, wherein the groups of stators are arranged such that each group of the stators of the first group is circumferentially adjacent a pair of groups of stators of the second group.

2. The SRV open rotor engine of claim 1, wherein the stators are spaced to reduce an acoustic signature of the SRV open rotor engine with respect to a uniform spacing of the stators.

3. The SRV open rotor engine of claim 1, wherein the non-uniform spacing prevents interference with connection of the SRV open rotor engine to an engine pylon for connecting the engine to a wing.

4. The SRV open rotor engine of claim 3, wherein the non-uniform spacing comprises a local spacing adjustment to prevent interference with airflow.

5. The SRV open rotor engine of claim 1, wherein the non-uniform spacing enables air to flow between at least a portion of the stators and past an engine pylon connecting the SRV open rotor engine to a wing.

6. The SRV open rotor engine of claim 1, wherein the non-uniform spacing provides a positive resonance with respect to a first portion of the stators and a negative resonance with respect to a second portion of the stators.

7. The SRV open rotor engine of claim 1, wherein the stators comprise a predetermined number of stators to create a negative reinforcement of the forcing function for a given number of rotor blades.

8. A swirl recovery vane (SRV) open rotor engine comprising:
an engine core;
a rotor having a plurality of rotor blades mounted to a front end of the engine core; and
a plurality of stators mounted aft of the rotor;
wherein the stators are spaced in a bi-tri spacing configuration to create a negative reinforcement of a forcing function created by movement of the rotor blades past the stators;
wherein the bi-tri spacing configuration of the stators provides a positive resonance with respect to a first portion of the stators and a negative resonance with respect to a second portion of the stators; and
wherein the bi-tri spacing configuration comprises a first group of three groups of stators in a first spacing and a second group of three groups of stators in a second spacing different from the first spacing, wherein the groups of stators are arranged such that each group of the stators of the first group is circumferentially adjacent a pair of groups of stators of the second group.

9. The SRV open rotor engine of claim 8, wherein the stators are further spaced to reduce an acoustic signature of the SRV open rotor engine with respect to a uniform spacing of the stators.

10. The SRV open rotor engine of claim 8, wherein the bi-tri spacing configuration prevents interference with connection of the SRV open rotor engine to an engine pylon for connecting the SRV open rotor engine to a wing.

11. The SRV open rotor engine of claim 8, wherein the bi-tri spacing configuration enables air to flow between at least a portion of the plurality of stators and past an engine pylon connecting the SRV open rotor engine to a wing.

12. The SRV open rotor engine of claim 8, wherein a number of the stators are selected to create a negative reinforcement of the forcing function for a given number of rotor blades.

13. A propulsion system comprising:
an engine core;
a rotor having a plurality of rotor blades mounted to a front end of the engine core; and
a plurality of stators mounted aft of the rotor, wherein the stators are spaced in a bi-tri spacing configuration comprising a first group of three groups of stators in a first spacing and a second group of three groups of stators in a second spacing different from the first spacing, wherein the groups of stators are arranged such that each group of the stators of the first group is circumferentially adjacent a pair of groups of stators of the second group; and
wherein the stators are spaced in a non-uniform spacing about the engine core.

14. The propulsion system of claim 13, wherein the non-uniform spacing reduces an acoustic signature of the propulsion system with respect to a uniform spacing of the stators.

15. The propulsion system of claim 13, wherein the non-uniform spacing prevents interference with connection of the propulsion system to an engine pylon for connecting the propulsion system to a wing.

16. The propulsion system of claim 13, wherein the non-uniform spacing enables air to flow between at least a portion of the stators and past an engine pylon connecting the propulsion system to a wing.

17. The propulsion system of claim 13, wherein the non-uniform spacing provides a positive resonance with respect to a first portion of the stators and a negative resonance with respect to a second portion of the stators.

18. The propulsion system of claim 13, wherein the bi-tri spacing configuration is configured to create a negative reinforcement of a forcing function created by movement of the rotor blades past the stators.

* * * * *